(12) United States Patent
Wystup

(10) Patent No.: US 11,362,603 B2
(45) Date of Patent: Jun. 14, 2022

(54) CAPACITANCE REDUCTIONS

(71) Applicant: ebm-papst Mulfingen GmbH & Co. KG, Mulfingen (DE)

(72) Inventor: Ralph Wystup, Künzel-sau (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 20 days.

(21) Appl. No.: 16/762,848

(22) PCT Filed: Nov. 7, 2018

(86) PCT No.: PCT/EP2018/080395
§ 371 (c)(1),
(2) Date: May 8, 2020

(87) PCT Pub. No.: WO2019/091996
PCT Pub. Date: May 16, 2019

(65) Prior Publication Data
US 2020/0287483 A1    Sep. 10, 2020

(30) Foreign Application Priority Data
Nov. 8, 2017 (DE) ............... 10 2017 126 150.8

(51) Int. Cl.
*H02P 6/10* (2006.01)
*H02P 23/26* (2016.01)
(Continued)

(52) U.S. Cl.
CPC ............... *H02P 6/10* (2013.01); *H02M 1/12* (2013.01); *H02M 1/4266* (2013.01); *H02P 23/26* (2016.02); *H02P 2201/15* (2013.01)

(58) Field of Classification Search
CPC ........ H02P 6/10; H02P 23/26; H02P 2201/15; H02M 1/12; H02M 1/4266
See application file for complete search history.

(56) References Cited

U.S. PATENT DOCUMENTS 5,994,869 A *  11/1999  Becerra ................... H02P 6/085
                                              318/729
7,495,410 B2 *  2/2009  Zargari ................... H02P 23/26
                                              318/729
(Continued)

FOREIGN PATENT DOCUMENTS

EP    0977337       2/2000
EP    2276162 A1    1/2011

OTHER PUBLICATIONS

International Search Report and Written Opinion dated Feb. 12, 2019.
(Continued)

*Primary Examiner* — Rina I Duda
(74) *Attorney, Agent, or Firm* — Dickinson Wright PLLC

(57) ABSTRACT

The disclosure relates to a method for reducing the torque ripple and noise evolution in an EC motor with single-phase feed by buffer-storing electrical energy in the EC motor, which is embodied with a power factor correction circuit (PFC) having a capacitor (Cz) at the power supply system input for a specific power supply system AC voltage UN, wherein the capacitance of the capacitor is dimensioned such that when the power supply system AC voltage UN is applied, a pulsating DC voltage is generated in a link circuit (Z), wherein the pulsating electrical energy generated as a result is stored by means of a primary regulation of the id current component as magnetic energy in the EC motor at least for a predefined time period.

11 Claims, 2 Drawing Sheets

(51) Int. Cl.
     *H02M 1/12*           (2006.01)
     *H02M 1/42*           (2007.01)

(56) References Cited

U.S. PATENT DOCUMENTS

| | | | | |
|---|---|---|---|---|
| 8,698,433 | B2* | 4/2014 | Green | H02P 21/0089 |
| | | | | 318/400.02 |
| 2011/0089912 | A1 | 4/2011 | Kamata et al. | |
| 2012/0194110 | A1* | 8/2012 | Konig | H02P 27/08 |
| | | | | 318/400.17 |
| 2013/0300327 | A1 | 11/2013 | Sekimoto et al. | |
| 2014/0306663 | A1* | 10/2014 | Ngo | H02M 1/14 |
| | | | | 320/128 |

OTHER PUBLICATIONS

Rolf Rothfuss, et al., "Flachheit: Ein Neuer Zugang zur Steuerung und Regelung Nichtlinearer Systeme," Automatsierunstechnik, Bd. 45, Nr. 11, Nov. 1, 1997.

Achir, Ali, et al., "A Bond-Graph Method for Flatness-Based Dynamic Feedback Linearization Controller Synthesis: Application to a Current-Fed Induction Motor"; Proceedings 20th European Conference on Modelling and Stimulation; Wolfgang Borutzy, Alessandra Orsoni, Richard Zobel; ECMS; 2006.

* cited by examiner

CAPACITANCE REDUCTIONS

RELATED APPLICATIONS

This application claims priority to German Patent Application No. 10 2017 126 150.8, filed Nov. 8, 2017, and PCT/EP2018/080395, filed Nov. 7, 2018, the entire contents of which are incorporated herein by reference in their entirety.

FIELD

The disclosure relates to a method for reducing the torque ripple in an electronically commutated (EC) motor with single-phase feed.

BACKGROUND

It is generally known that the circuit concept of EC motors typically used in ventilation fans is not free of disturbances caused in the power supply system. The pulsating input current of EC ventilation fans causes current harmonics. These increase the load on the power supply system and may lead to increased losses due to reactive loads, possibly even negatively affecting other devices on the same power supply system within a facility. Furthermore, they also lead to a not sufficiently constant current consumption, and thus torque ripple, in the motors. To prevent this, various solutions integrated in the electronics exist, such as active or passive power factor correction (PFC).

In order to achieve a temporally sinusoidal progression of the power supply current in EC motors with single-phase feed, a PFC circuit generally is provided, which supplies a smoothed DC voltage at its output. In one known method, the pulsating input current of the EC motors is converted into a sinusoidal current, for example, and the position of the current curve is shifted in a subsequent second step such that it is in phase with the voltage. In this manner, the harmonics components in the input current can be greatly reduced, for example.

In order to achieve this, the PFC circuit requires a sufficiently dimensioned electrolytic capacitor in the link circuit. In voltage link circuit inverters such capacitors are used as energy storage devices for decoupling the load-side and the power supply system-side current inverters. However, if the capacitance of the link circuit capacitor is reduced, or if it is omitted entirely, as is the case in the "slim link circuit," the result is a pulsating DC voltage with a superimposed AC voltage at the output of the PFC circuit, which leads to torque ripple.

For example, EP 0 802 623 A1 discloses a frequency inverter, which is supplied from a DC voltage source, wherein the inverter comprises a buffer for storing commutation energy due to conversion processes in individual phase windings.

It is known from EP 0 738 035 A2 to embody a frequency inverter without smoothing capacitor. Herein, the energy is buffered in a capacitor during the charging and discharging processes, which capacitor is connected between the switched negative terminal of the phase connection and the negative terminal of the DC link circuit. This capacitor functioning as a buffer also must be dimensioned for the total voltage of the link circuit, which is comprised of the sum of the peak value of the power supply system voltage and the voltage component contributed by a coil demagnetizing during the commutation; this capacitor cannot arbitrarily be reduced in size without such a reduction leading to the aforementioned torque ripple.

A frequency inverter for operating a motor is known from DE 44 06 546 B4, which inverter comprises a rectified and almost completely smoothed DC voltage link circuit. Here, a combination of transformer and capacitor forms the shared buffer used to store energy during the charging and discharging processes. Herein, the transformer is clocked via an additional switch, such that an optimal transfer of energy is created during the charging and discharging processes. However, this frequency inverter is fairly complex and expensive due to the additional transformer.

Other alternative solutions utilize the stator of the EC motor as a capacitor (stator capacitor), for example, or utilize the zero-inductance circuit as a buffer.

However, because smoothing capacitors increase manufacturing costs, it is desirable to reduce the installed capacitance in EC motors with power factor correction (PFC) at the power supply system input. In order to generate a constant motor torque, which is absolutely essential for the low-noise operation of a ventilation fan, a constant DC voltage is required, which leads to constant motor power output and, therefore, at constant motor speed, to a constant motor torque. However, given a pulsating DC voltage, the electric power output only is constant if the current also is pulsating in such a manner that the product of current and voltage correspondingly is constant.

BRIEF SUMMARY

It therefore is the object of the present disclosure to overcome the aforementioned disadvantages and to provide a low-cost and reliable solution for EC motors with single-phase feed and power factor correction (PFC) at the power supply system input.

This object is solved by the combination of characteristics according to the claims.

One underlying concept of the present disclosure is to store energy in the motor and not only or not exclusively in an electrolytic capacitor, specifically by deliberately specifying a dynamic id current trajectory. Therein, the adjustment of the current consumption in EC motors with a pulsating DC voltage at the inverter input can be achieved by adjusting the id current generating the field.

According to the disclosure, a method is provided for reducing the torque ripple and noise evolution in an EC motor, specifically one with a single-phase feed, by buffer-storing electrical energy in the EC motor, which is embodied with a power factor correction circuit (PFC) having a capacitor at the power supply system input for a specific power supply system AC voltage $U_N$, wherein the capacitance of the capacitor is dimensioned such that when the power supply system AC voltage $U_N$ is applied, a pulsating DC voltage is generated in a link circuit, wherein the pulsating electrical energy generated as a result is stored by means of a primary regulation of the id current component as magnetic energy in the EC motor at least for a predefined time period.

Unlike in PFC circuits having a sufficiently dimensioned link circuit capacitor for storing the (electrical) energy, the capacitor in the present disclosure is undersized by design, such that the electrical energy has to be stored otherwise, namely, as proposed according to the disclosure, in the EC motor, as magnetic energy in the motor windings. Thus, a change in the id current results in a storage of magnetic energy.

The undesirable pulsation of the motor torque caused by the pulsation of the DC voltage, due to undersized electrolytic capacitors, thereby can be compensated for by controlling the id current, according to the disclosure. The implementation of the necessary, highly dynamic current progression is achieved by using a trajectory-tracking, flatness-based, non-linear regulation in the state space, in conjunction with the reduction of the PFC capacitance values. The use of this regulation concept makes it possible to regulate the necessary id current progression exactly and/or as desired.

According to a preferred embodiment of the disclosure, it is provided that the control for storing the energy comprises the adjustment of the field-generating id current component, wherein it furthermore is advantageous if the control uses the aforementioned trajectory-tracking, flatness-based, non-linear regulation in the state space.

In one advantageous embodiment of the disclosure, it is provided that the frequency of the id current trajectory is equivalent to double the power supply system frequency of the power supply system AC voltage $U_N$, and that it is synchronized with the power supply system frequency.

It is furthermore advantageous if the amplitude and phase position of the id current compared to those of the power supply system AC voltage $U_N$ is adjusted by a second regulation, which is superimposed on the primary regulation, such that the pulsation of the DC voltage generated in the link circuit is reduced or minimized (preferably to a minimum).

As the proposed regulation concept is a type of regulation which relates to two output values (amplitude of the id current and the phase position compared to the power supply system voltage) and one input value (pulsation amplitude), it is required as an additional regulation condition that the amplitude of the id current must be kept as low as possible to minimize the losses caused by the additional id current. For this purpose, the amplitude of the id current is selected to be as low as possible within the available amplitude-phase position regulation field.

Another advantageous design of the disclosure provides that the amplitude of the id current is set to a negative value to achieve a reduction of the iron losses in the EC motor due to the resulting field weakening. In one particularly favorable case, the additional losses caused by the id current are exactly cancelled out by the reduction of the iron losses caused by the id current, and the advantage of the reduction of the capacitance of the link circuit capacitor is not achieved at the expense of a decreased efficiency of the EC motor.

Another aspect of the present disclosure relates to an EC motor that can be supplied with a single-phase feed and which has a link circuit for implementing the aforementioned method, comprising a power supply system input for connecting to at least one specific power supply system voltage $U_N$, a power factor correction circuit (PFC) having a capacitor on the side of the power supply system input, wherein the capacitance of the capacitor is dimensioned to be undersized, such that when a power supply system voltage $U_N$ is applied, a pulsating DC voltage $U_{ZK}$ is generated in the link circuit, further comprising a primary regulating device which is embodied to regulate the id current in such a manner that the pulsating electrical energy can be stored as magnetic energy in the EC motor at least for a predefined period of time.

It is advantageous if the EC motor is embodied such that a second regulation is provided to adjust the amplitude and phase position of the id current compared to those of the power supply system voltage $U_N$.

In another advantageous design of the disclosure it is provided that the second regulation for adjusting the phase position and amplitude of the id current is embodied such that it is used to reduce or minimize the pulsation of a DC voltage generated in the link circuit.

BRIEF DESCRIPTION OF THE DRAWINGS

Other advantageous developments of the disclosure are characterized in the dependent claims and/or are explained in more detail in the following in conjunction with the description of the preferred embodiment of the disclosure based on the drawings. These show:

In the following, the disclosure is described in more detail in reference to FIGS. 1 and 2 based on an exemplary embodiment of the disclosure.

DETAILED DESCRIPTION

Figure 1:
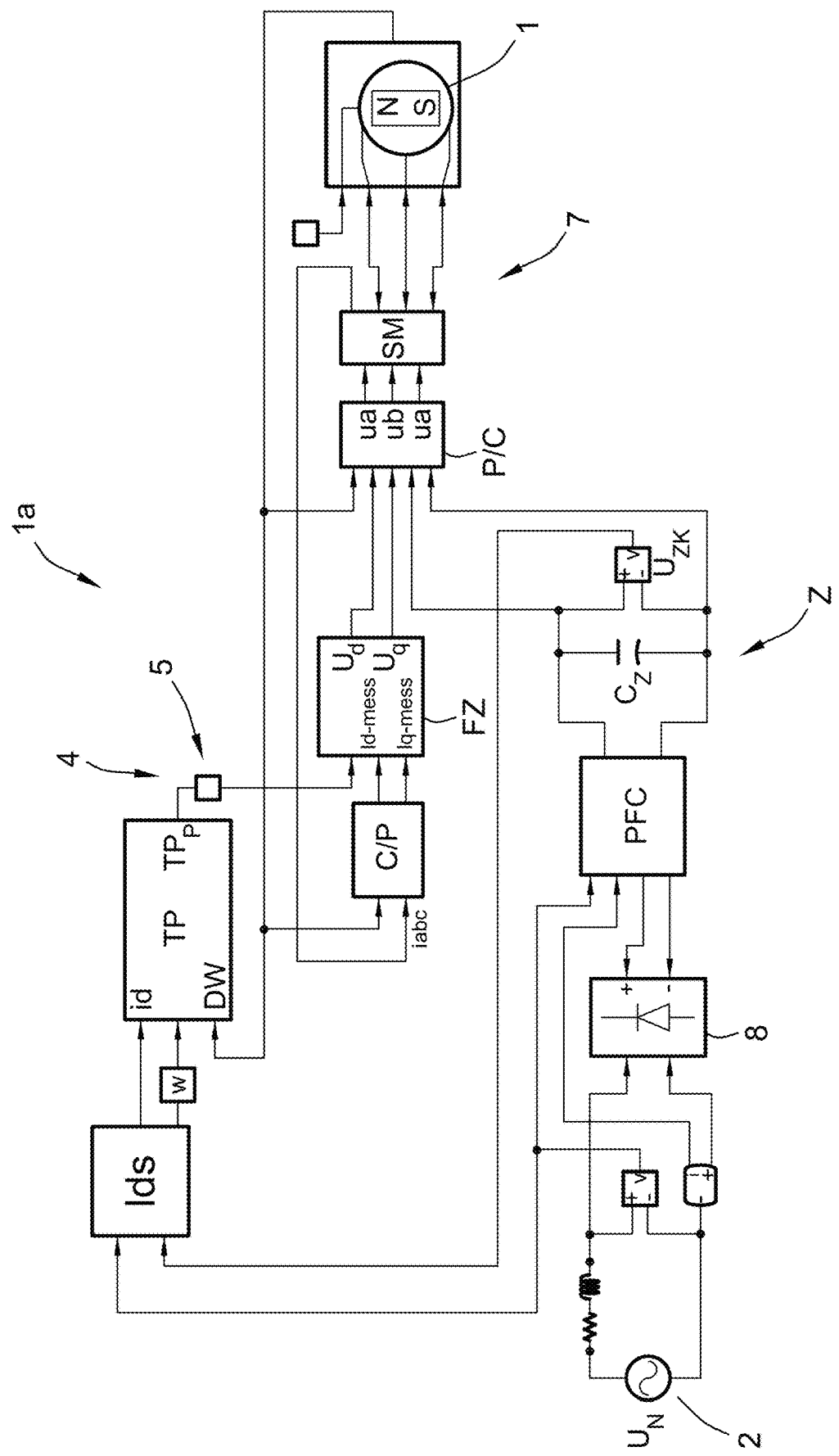
FIG. 1 A schematic view of an EC motor according to the disclosure.

In this context, FIG. 1 shows a schematic view of an EC motor 1 for a ventilation fan. The EC motor 1 is connected to a circuit arrangement 1a comprising a link circuit Z (that is, the link circuitry Z) for generating the link circuit DC voltage $U_{ZK}$, wherein the link circuit is embodied having a link circuit capacitor $C_Z$. Furthermore, the circuit arrangement 1a has a power supply system input 2 and a rectifier 8. The link circuit Z is connected to the EC motor 1 via a commutation circuit 7. The link circuit Z carries the nominal voltage $U_{ZK}$ in its nominal operation, which voltage is generated by the power supply system input circuit 2a and the rectifier 8. A power factor correction circuit (PFC) is provided upstream of the link circuit Z.

Herein, the capacitance of the capacitor $C_Z$ is dimensioned such that when a power supply system AC voltage $U_N$ is applied, a pulsating DC voltage is generated in the link circuit Z.

To reduce the AC voltage components in the pulsating DC voltage, a primary regulation device 4 and a secondary, or additional, regulation device 5 are embodied to regulate the motor current. Therein, the regulation 4 considers an id target value specification id-S, a target motor speed w and a trajectory plan TP, in which the motor speed target, the id current progression and the rotation angle DW are used as parameters. Out of these, the trajectory parameters $TP_P$ are generated, which then are transferred to a flatness-based state regulator FZ with monitor. Following a Clark/Park transformation C/P, the flatness-based state regulator FZ with monitor receives the values id-Mess and iq-Mess. The voltage values $U_d$ and $U_q$, are transferred from the flatness-based state regulator FZ to the Clark-Park control element P/C, which additionally processes values such as angle position, as well as plus and minus of the link circuit voltage $U_{ZK}$, to obtain the voltage values $U_a$, $U_b$ and $U_c$ from the same. These are transferred to the motor via a three-phase current measurement SM. The three-phase current measurement SM therein transfers the current value $I_{abc}$ back to the C/P control element.

Thus, the regulation of the id current component is performed in such a manner that the pulsating electrical energy can be stored as magnetic energy in the EC motor 1 at least for a predefined period of time.

Figure 2:
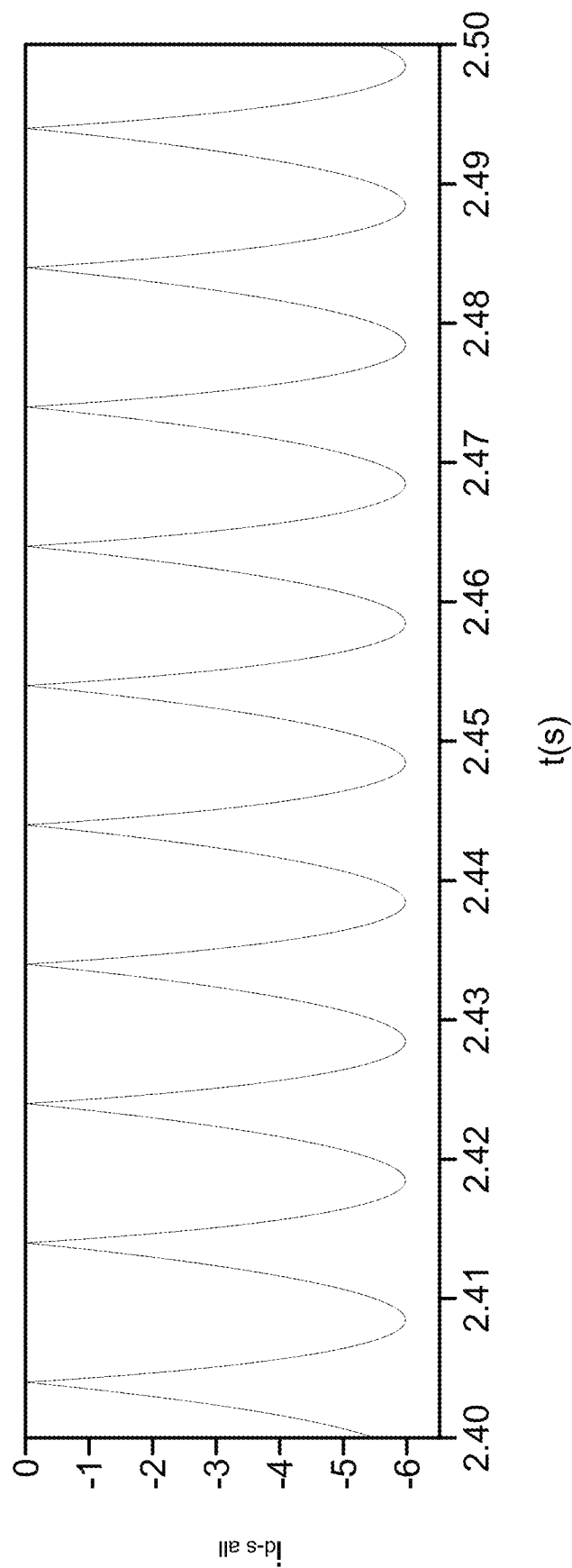
FIG. 2 A representation of the progression of the id current over time.

Furthermore, the regulation 5 serves to adjust the amplitude $I_A$ (as shown in FIG. 2) and phase position of the id current compared to those of the power supply system voltage $U_N$, wherein the generated pulsating electrical energy is stored as magnetic energy in the EC motor 1 via the regulation of the id current component by means of the primary regulation 4. The undesirable pulsation of the motor torque caused by the pulsation of the DC current, due to an intentionally undersized capacitance value of the capacitor, can be compensated for by the control 4, 5 of the id current. The id current progression required for this is shown in FIG. 2, wherein only negative current impulses are generated.

The invention claimed is:

1. A method for reducing torque ripple and noise evolution in an electronically commutated (EC) motor with single-phase feed and a power factor correction circuit (PFC) having a capacitor at a power supply system input for a specific power supply system AC voltage $U_N$, the method comprising:
   dimensioning the capacitance of the capacitor ($C_Z$) such that when the power supply system AC voltage $U_N$ is applied, a pulsating DC voltage is generated in a link circuit (Z); and
   buffer-storing electrical energy in the EC motor, wherein the pulsating electrical energy generated in the link circuit (Z) is stored by means of a primary regulation of an id current component as magnetic energy in the EC motor at least for a predefined time period.

2. The method according to claim 1, wherein the regulation for storing the energy comprises adjusting the field-generating id current component.

3. The method according to claim 1, wherein a trajectory-tracking, flatness-based, non-linear regulation in the state space is used for controlling the id current component.

4. The method according to claim 3, wherein a frequency of an id current trajectory is equivalent to double the power supply system frequency of the power supply system AC voltage $U_N$, and wherein the frequency of the id current trajectory is synchronized with the power supply system frequency.

5. The method according to claim 1, wherein the amplitude and phase position of the id current component compared to those of the power supply system AC voltage $U_N$ are adjusted by a second id target value specification, which is superimposed on the primary regulation, such that the pulsation of the DC voltage generated in the link circuit (Z) is reduced or minimized.

6. The method according to claim 5, wherein, during the regulation, the amplitude of the id current component is selected to be a lowest amplitude within the available amplitude-phase position regulation field.

7. The method according to claim 1, wherein the amplitude of the id current component is set to a negative value to achieve a reduction of iron losses in the EC motor due to a resulting field weakening.

8. A circuit arrangement for an electronically commutated (EC) motor having a link circuit (Z) and which can be supplied with a single-phase feed, comprising:
   a. a power supply system input for connecting to at least one specific power supply system voltage $U_N$,
   b. a power factor correction circuit (PFC) having a capacitor ($C_Z$) on the side of the power supply system input, wherein the capacitance of the capacitor ($C_Z$) is dimensioned such that when a power supply system voltage $U_N$ is applied, a pulsating DC voltage $U_{ZK}$ is generated in the link circuit (Z),
   c. a primary regulating device comprising a trajectory plan (TP) and a flatness-based state regulator (FZ) which is configured to regulate an id current component in such a manner that the pulsating electrical energy can be stored as magnetic energy in the EC motor at least for a predefined period of time.

9. The circuit arrangement according to claim 8, further comprising:
   d. a second regulation device that adjusts the amplitude ($I_A$) and phase position of the id current component compared to those of the power supply system voltage $U_N$.

10. The circuit arrangement according to claim 9, wherein the second regulation device provides a second regulation for adjusting the phase position and amplitude of the id current component and is configured such that the pulsation of a DC voltage generated in the link circuit (Z) is reduced or minimized.

11. An electronically commutated (EC) motor having the circuit arrangement according to claim 8.

* * * * *

UNITED STATES PATENT AND TRADEMARK OFFICE
CERTIFICATE OF CORRECTION

PATENT NO. : 11,362,603 B2
APPLICATION NO. : 16/762848
DATED : June 14, 2022
INVENTOR(S) : Ralph Wystup It is certified that error appears in the above-identified patent and that said Letters Patent is hereby corrected as shown below:

On the Title Page

In Column 1, item (54), The title. Please change CAPITANCE REDUCTIONS to CAPITANCE REDUCTION In Column 1, item (72), Inventor address should read Künzelsau instead of Künzel-sau In the Specification In Column 1, Line 1, The title. Please change CAPITANCE REDUCTIONS to CAPITANCE REDUCTION Signed and Sealed this
Twenty-second Day of November, 2022

Katherine Kelly Vidal
*Director of the United States Patent and Trademark Office*